Jan. 26, 1932.    E. N. SPENCE    1,842,735
TANK CONSTRUCTION
Filed July 10, 1930    2 Sheets-Sheet 1
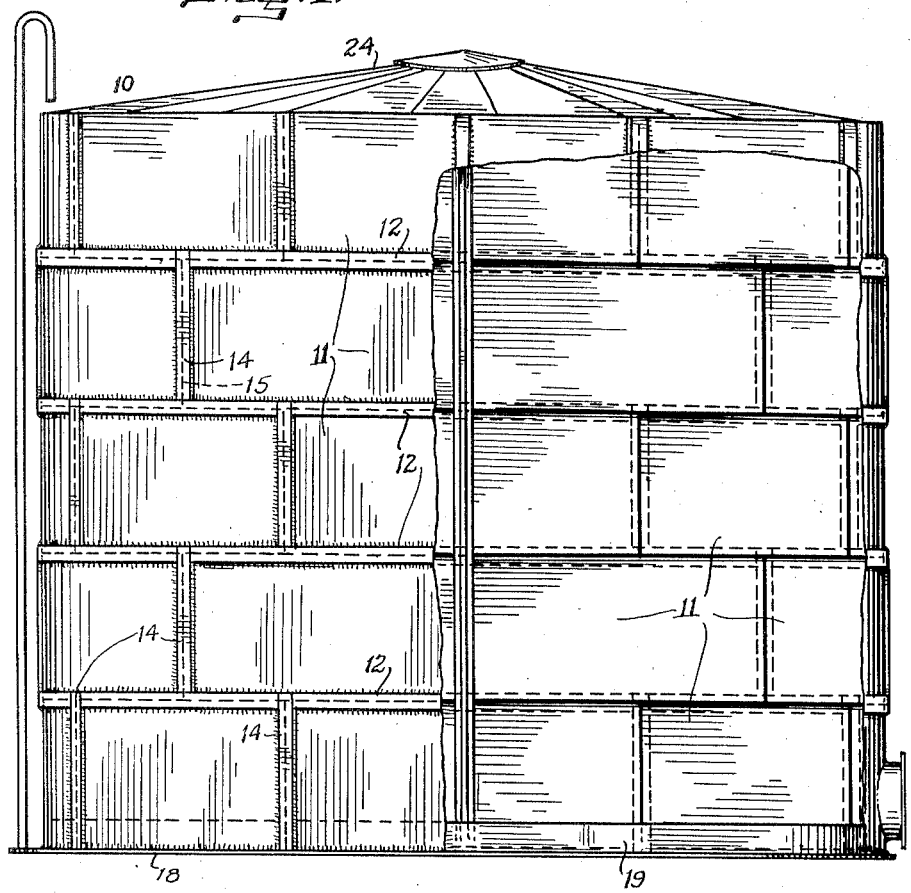
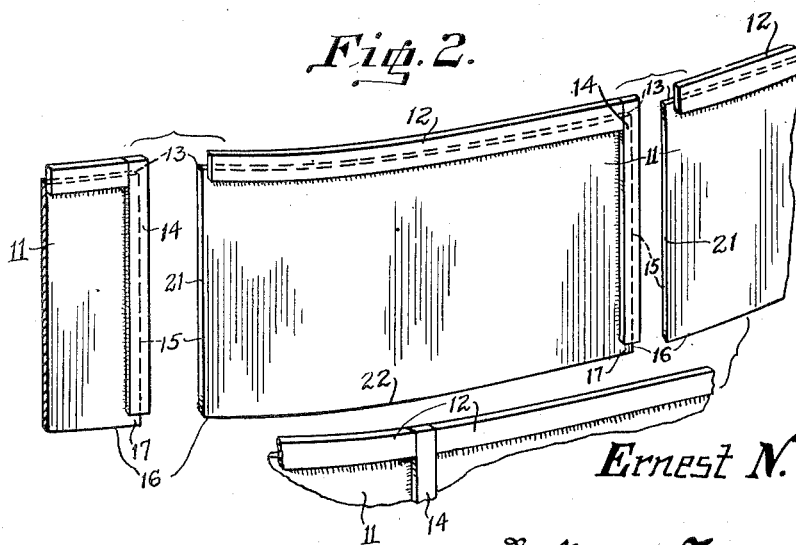
Inventor
Ernest N. Spence
By Mason Fenwick & Lawrence
Attorneys Jan. 26, 1932.    E. N. SPENCE    1,842,735
TANK CONSTRUCTION
Filed July 10, 1930    2 Sheets-Sheet 2
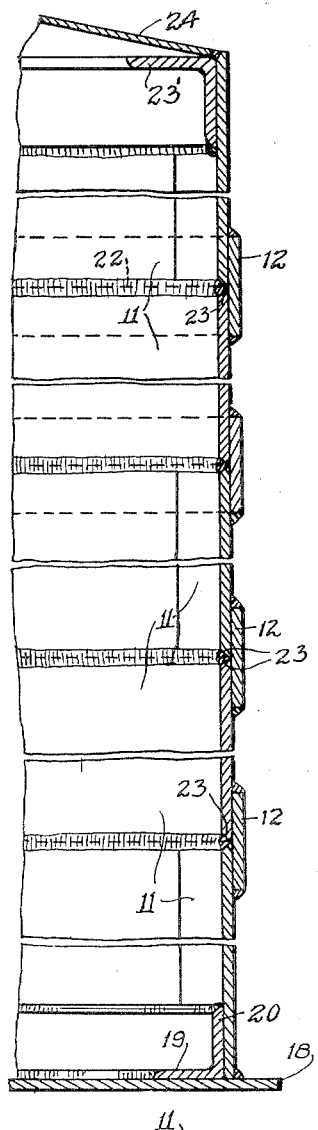
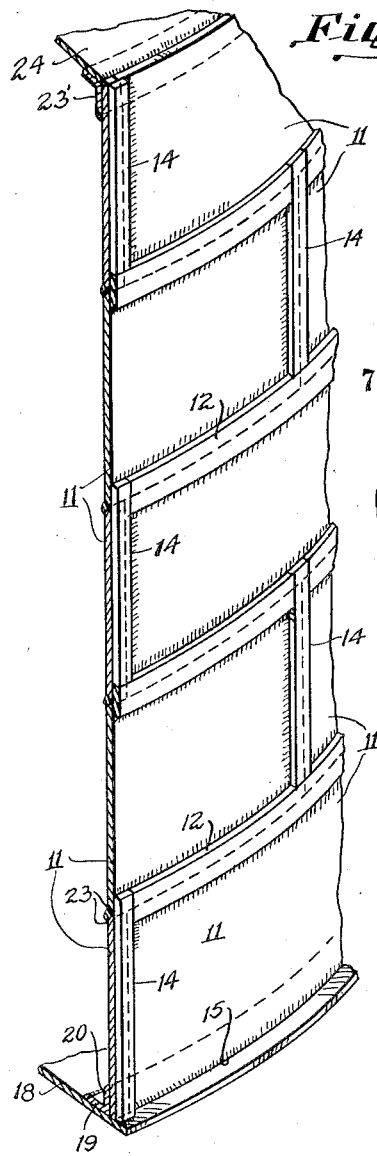
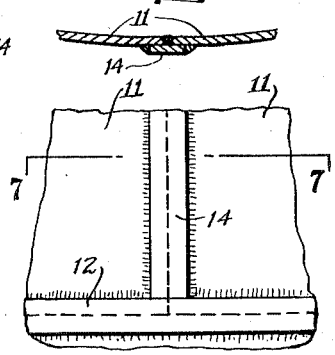
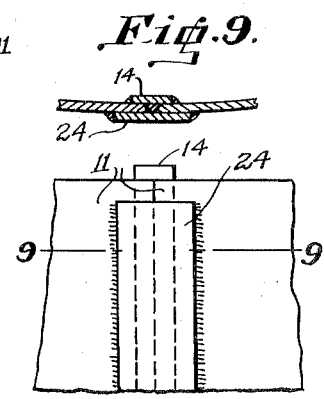
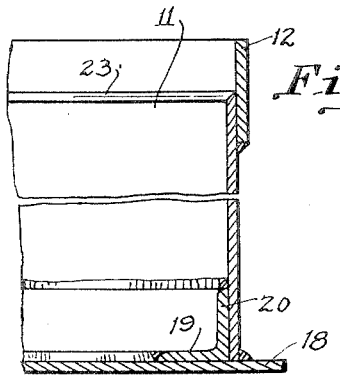
Inventor
*Ernest N. Spence*
By *Mason Fenwick & Lawrence*
Attorneys Patented Jan. 26, 1932

1,842,735

UNITED STATES PATENT OFFICE

ERNEST NEAL SPENCE, OF NEW ORLEANS, LOUISIANA, ASSIGNOR TO WELDED PRODUCTS CO. OF LOUISIANA, INC., OF NEW ORLEANS, LOUISIANA

TANK CONSTRUCTION

Application filed July 10, 1930. Serial No. 467,058.

This invention relates to tank construction; and more particularly, to the method of forming the joints between the various sections.

The prime object of the invention is to produce a tank of the simplest construction that is of the utmost strength and leak proof efficiency, and at the same time, to eliminate the shearing of rivets and plates so common in prior construction.

Another object is to provide plates in which most of the welding is done in the shop, the plates being cut to size so that they may be readily utilized in the construction of the tank in the field.

Still another object is to eliminate overhead welding in the field, and reduce field welding to a minimum.

Heretofore it has been the usual practice to form tanks in sections, the sections being either riveted or lap-welded. While both of these methods have been successfully used, they are both open to objections, particularly in the process of assembly, and handling, the riveting method being particularly objectionable in that as the sections increase in number, the entire weight of the tank is supported by the rivets which have a tendency to shear off, warp, corrode, and otherwise prove objectionable. Where the simple lap-joint is used and welded, an unsightly, uneven surface is presented which collects scale and débris, making it difficult to keep the same clean, and in which the entire weight of the tank is borne by the welding.

In my invention, I utilize what I choose to call a butt strap method in which the weight of the respective sections are borne by the sections beneath since they are placed butt to butt, and also I utilize a much stronger joint. By placing a strap over the joint and welding the same at three different points, the strain is not nearly so severe as in the old type of joints.

Another object is to cut the sections to size, shop welding straps on the sections so that there remains only to fit the same in place in the field and weld the straps to the adjacent sections.

Other objects will be disclosed in the specification and drawings forming a part of my application.

In the drawings:

Figure 1 is a side elevation of the tank, with parts broken away;

Figure 2 is a perspective detail of plates in spaced relation;

Figure 3 is a partial section through a portion of the device assembled;

Figure 4 is a perspective detail of construction, partly in section;

Figure 5 is a fragmentary section of the lower course;

Figure 6 is a fragmentary elevation of one of the plate members;

Figure 7 is a section taken on line 7—7 of Figure 6;

Figure 8 is a fragmentary elevation of one of the plate members; and

Figure 9 is a section taken on line 9—9 of Figure 8.

Referring to the drawings, in which like parts are designated by similar numerals:

Numeral 10 designates a tank of the vertical storage type of welded construction. The tank 10 is composed of plates of metallic material 11, having strap 12 welded along the upper edge and another strap 14 welded along the side edge 15. The strap 12 is positioned so as to extend above the edge 13, but is slightly shorter than the edge 13 so that a portion of the side 13 is left at both ends. The strap 14 extends slightly beyond the upper end of side 15, but is short of the lower end 16 and side 15, leaving a space 17.

As actually used, the plates 11 are cut to size in the shop and the straps 12 and 14 welded thereon in the manner described. The plates 11 are then rolled to the proper radius of the tank and transported to the field. There a bottom plate 18 is laid, and a bottom curve in the form of an angle iron 19 is welded to the bottom plate 18.

For the bottom course, plates 11 are used, but the straps 14 instead of being spaced from the lower end 15 continue the length of the side and to this extent must be modified, as shown in Figure 2, from the rest of the plates. The plates 11 forming the bottom course are welded to the upturned leg 20 of the angle 19, the side 21 of each plate fitting beneath the strap 14 of the adjacent plate, and being welded in position.

The second course is erected in a similar manner, except that the strap 12 takes the place of turned-up leg 20 of the angle iron 19 and the bottom side 22 is welded to the strap 12, the inner edge 23 of the bottom side 22 being slightly beveled as shown in Figure 4 to facilitate the butt weld. The sides 21 of the adjoining plates are inserted under the adjacent strap and welded in place, the operation being repeated until the second course is completed. At each juncture, there are in addition to the butt welds, the strap welds, which insure strength and rigidity which is not found in any other prior construction.

It is to be noted that each plate 11 is placed in staggered relation to the plate below so that each course appears in staggered relation to the course immediately below.

With this arrangement, no two joints are directly beneath each other, thus giving the maximum strength of construction. Upon the last course being completed, circular angle irons 23 in the form of rings are welded to the inside of the last course and form securing means for the tank top 24.

It is obvious from my description that I have greatly simplified the construction of tanks in the field by cutting the plates to size, welding the straps in place, and rolling the plates to the proper radius, and thus the work in the field is materially lessened.

I have found that much of the inefficiency and errors occur in the construction in the field, and by my particular type of construction, I have made possible an increase in work that can be done in the shop. It is also obvious that the work in the field will be greatly facilitated by having the plates cut to size, welded and rolled, so that the parts may be readily fitted into place and welded.

By the combination of my butt weld and strap weld, the most efficient and strongest possible joint is produced, which obviates the many objections to the use of rivets and simple lap welds.

Although I have described my method as particularly adapted to have the rolling and welding of the straps on the various sections done in the shop, it is obvious that these steps may be done in the field, particularly the welding, without departing from the novelty of my invention as relating to the particular type of joint used in tank and similar constructions.

As shown in Figures 8 and 9, a double butt strap may be used. In other words, in addition to the strap 14, a wider strap 24 is placed on the inside and welded in place. I find, however, this added strap 24 is not necessary, and is objectionable in spite of its added strength due to the fact that it breaks the interior surface of the tank.

Although I have described my invention as being particularly adapted to tanks, it is obvious that it may be utilized in other forms of construction without departing from the spirit of the invention.

What I claim is:

1. In tank construction, a plate cut to size and adapted to form a part of the wall construction, a strap formed along the upper edge and one side edge and positioned so as to overlap the marginal edge of the respective sides, the overlap portion being adapted to be welded to adjacent plates.

2. A butt strap weld for tanks and the like adapted to be used in connection with a plurality of plates, each plate having a strap formed along its top and an adjacent side, the plates being arranged adjacent to each other in a plurality of courses, the courses being formed one above the other, the plates adjacent each other in the bottom course being so arranged as to have their free side edges inserted beneath the straps formed on the respective side edges, the plates forming the second course having their bottom edges placed in contact with the top edges of the plates forming the first course, and in contact with the straps along the top edge of the plates forming the lower course, the upper edges of the lower course and the lower edges of the upper course adapted to be butt welded and the other sides strap-welded to secure the same in position.

3. A butt strap weld for tanks and the like adapted to be used in connection with a plurality of plates, each plate having a strap formed along its top and an adjacent side, the plates being arranged adjacent each other in a plurality of courses, the courses being formed one above the other, the plates adjacent each other in the bottom course being so arranged as to have their free side edges inserted beneath the straps formed on the respective side edges, the plates forming the second course being arranged so as to straddle the joints of the plates in the lower course, and having their bottom edges placed in contact with the top edges of the plates forming the lower course, and in contact with the straps along the top edge of the plates forming the lower course, the upper edge of the lower course and the lower edge of the upper course adapted to be butt-welded and the other sides strap-welded to secure the same in position.

4. A tank comprising a bottom plate, an angle iron secured to said bottom plate, a plurality of plates secured to the angle iron and arranged in edge to edge contact with each other, a strap secured to the adjacent side edges and overlapping the same, a second strap secured to the top of sides and projecting beyond the upper edge, a second course of plates similar to the first course, the bottom edges of which being butt-welded to the top edges of the bottom course of plates and secured to the second strap, another strap similar to the first strap securing the adjacent side edges of the second course together, a roof secured to the top edges of said second course.

5. In tank construction, a plate adapted to form a part of a wall construction, a strap formed along the upper edge and one side edge and positioned so as to overlap the marginal edge of the respective sides, the side opposite from the side having the strap having its lower edge beveled.

In testimony whereof I affix my signature.

ERNEST NEAL SPENCE.